Jan 6, 1931. S. J. LONERGAN 1,787,450
HEATING APPARATUS
Filed May 19, 1927 5 Sheets-Sheet 1

Jan 6, 1931.  S. J. LONERGAN  1,787,450
HEATING APPARATUS
Filed May 19, 1927   5 Sheets-Sheet 2

Inventor
Simon J. Lonergan
By F. A. Pitt  Attorney

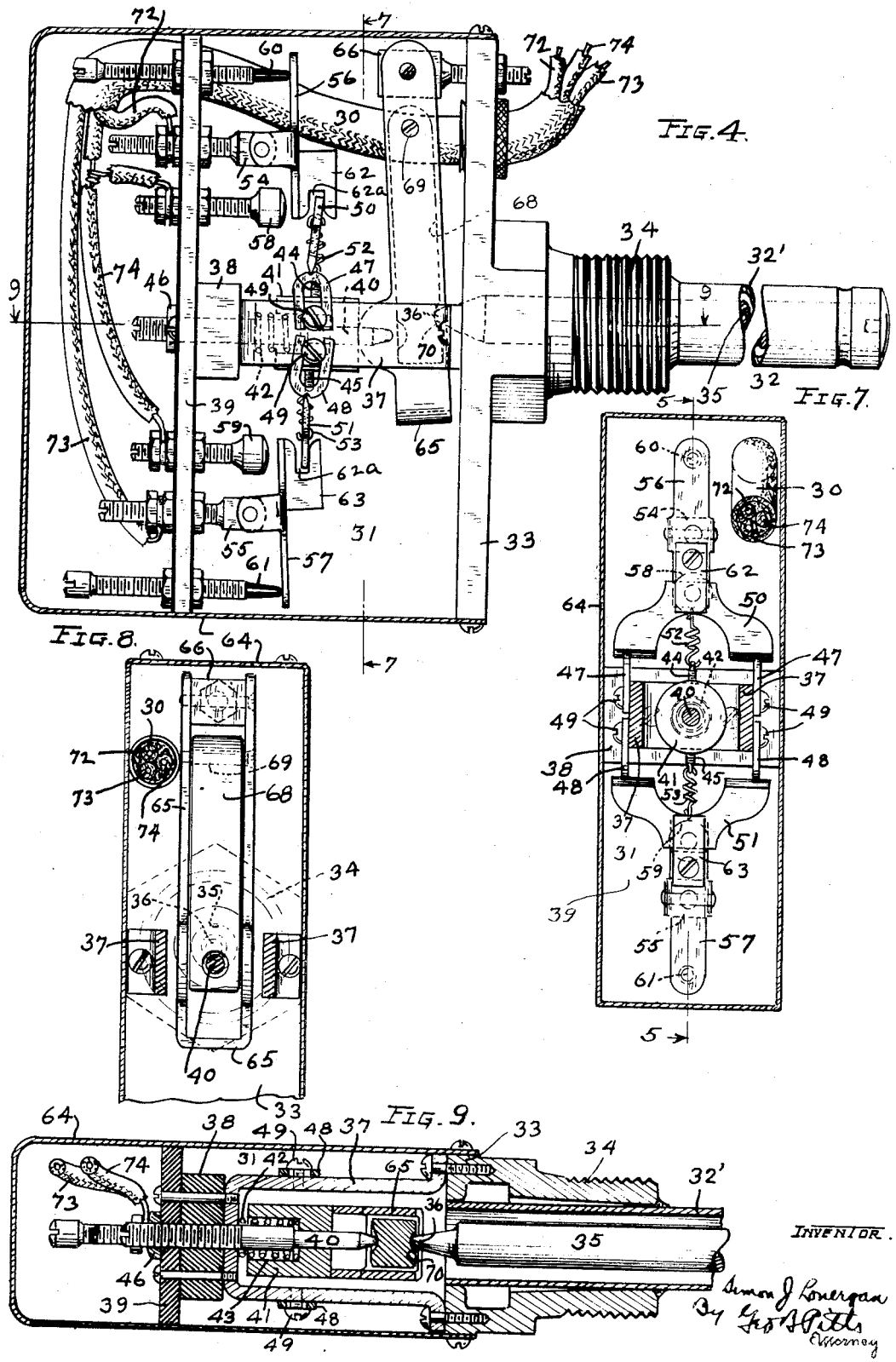

Inventor
Simon J. Lonergan
By Geo. A. Pitts
Attorney

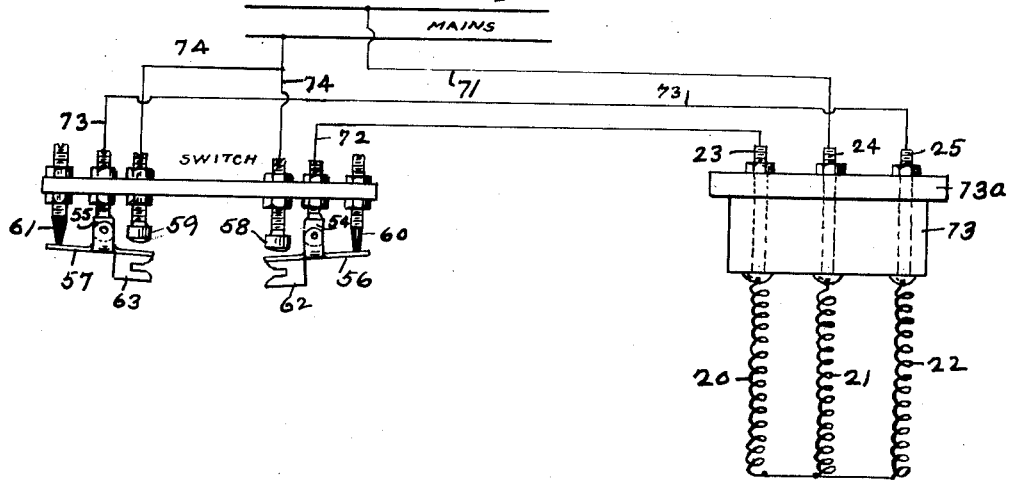
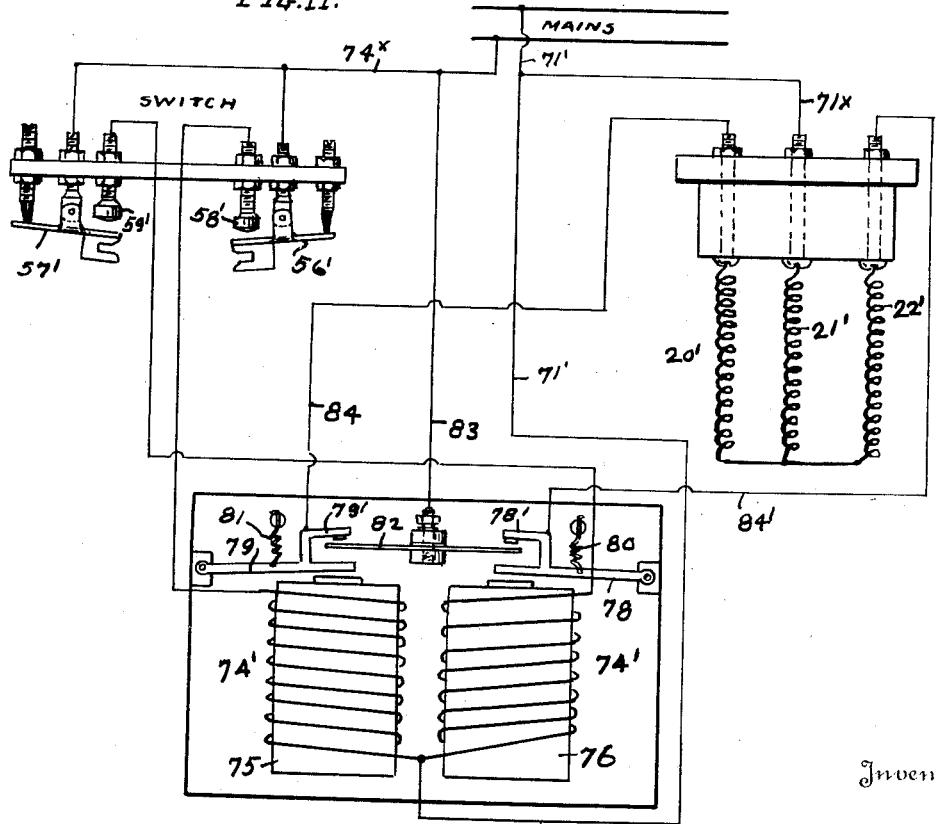

Patented Jan. 6, 1931

1,787,450

UNITED STATES PATENT OFFICE

SIMON J. LONERGAN, OF LA PORTE, INDIANA, ASSIGNOR TO BASTIAN-MORLEY CO., OF LA PORTE, INDIANA, A CORPORATION OF INDIANA

HEATING APPARATUS

Application filed May 19, 1927. Serial No. 192,750.

The present invention has reference to an electric heater and more particularly to that type of heater known as a fluid storage heater in which the heat is supplied to a fluid stored in a tank or receptacle by means of electrical energy.

It is an object of the present invention to provide a structure of this type in which the rate at which electrical energy supplied to heat the fluid is automatically controlled by the temperature of the fluid.

Stated more specifically it is an object of the present invention to provide a heater of the type referred to having a plurality of heating elements, a greater or less number of which are energized depending upon the temperature conditions of the fluid in the heater.

It is a further object of the present invention to provide a structure of the class described in which proper provisions are made for suitable expansion and contraction in the various portions of the structure which are subjected to temperature changes.

It is a still further object of the present invention to provide a heating element or elements which may be readily removed from the top of the storage tank or receptacle.

Another object of the invention is to construct an improved heater in which provision is made for heating fluid without resulting liming on the heated walls in contact with the fluid.

Another object of the invention is to provide a heater having a plurality of heating means under control of a single thermostat, whereby one or more of such means will be operated in accordance with the demands upon the heated supply of fluid.

Further objects and advantages will hereinafter more fully appear from the following description taken in connection with the accompanying drawings, wherein—

Figure 6:
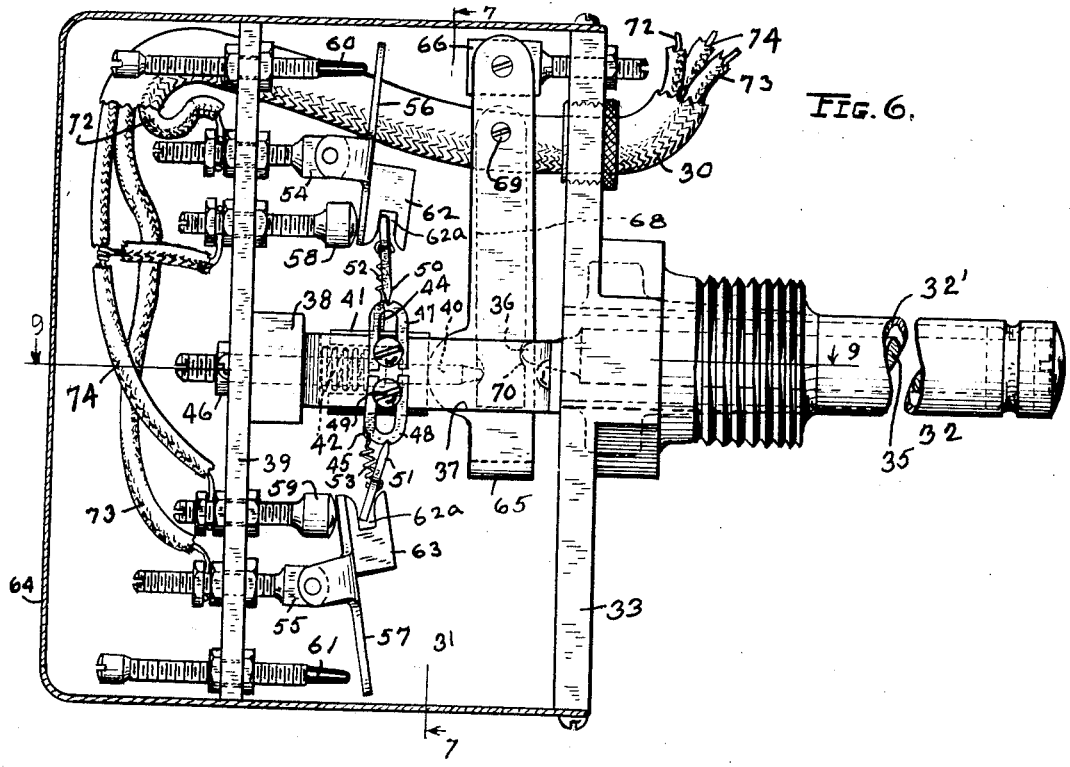
Figure 5:
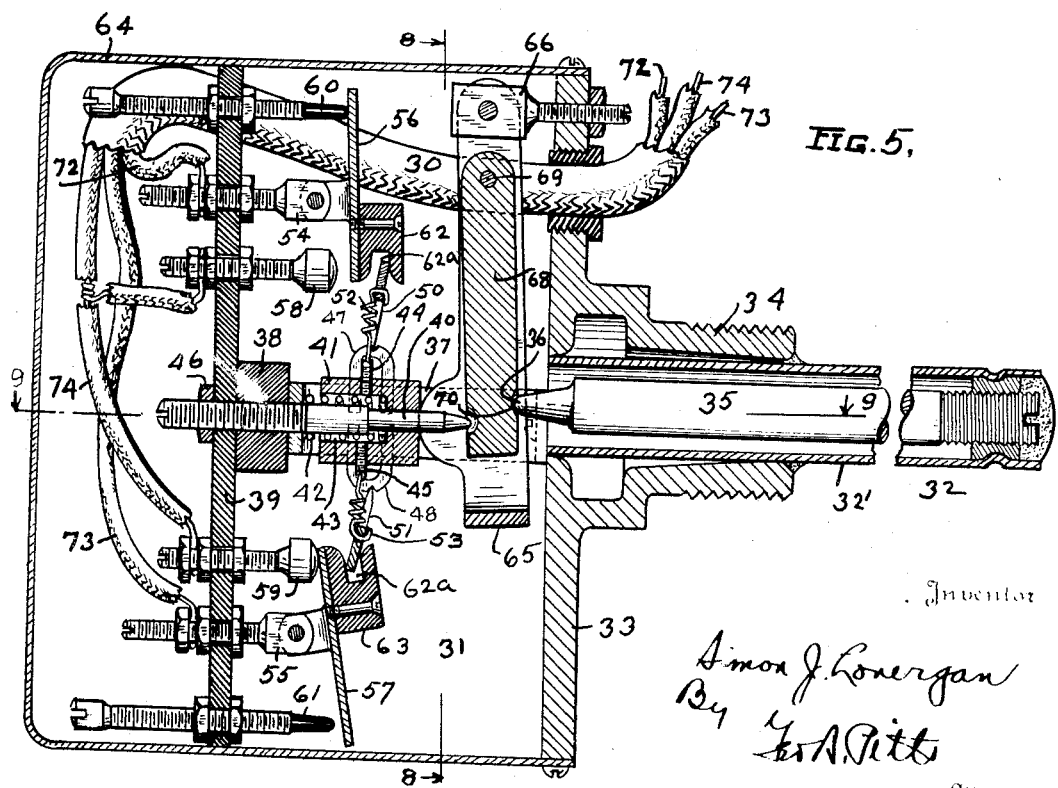

Figs. 4, 5 and 6 (the latter being a section on the line 6—6 of Fig. 7) are enlarged views of the thermostatically actuated switch for controlling the energization of the heating elements and associated thermostat, showing the different positions of the switch contacts;

Fig. 7 is a section on the line 7—7 of Figs. 4 and 6;

Fig. 8 is a section on the line 8—8 of Fig. 5;

Fig. 9 is a section on the line 9—9 of Figs. 4, 5 and 6;

Figure 10 is a diagrammatic view of one arrangement of the electrical circuits which may be used in a heater of the character described; and Figure 11 is a diagrammatic view of a modified arrangement of electrical circuits which may be employed.

Referring now to the drawings and more particularly to Figs. 1, 2, 3, 4, 5, 7 and 8, the structure disclosed therein comprises a tank or receptacle 1 located within a jacket or casing 2, the space intermediate the jacket and tank being filled with heat insulating material, 3, such as asbestos, cork filler, mineral wool or hair felt. The tank 1 and insulation 3 rest on a suitable bottom 1a preferably comprising a base 1b having a flange fitting around the lower edge of the jacket 2 and a layer of insulation 1c. The top of the tank 1 is covered with a layer of insulation 1c'.

The outer portion of the insulation 1c' rests on the upper end edge of the insulation 3 to form a continuous body of insulation along the side of the tank and over its top for a purpose which will later appear. The insulation 1c' is provided with a sheathing 1d having a flange 1d' within which the jacket 2 fits. The central portion of the insulation 1c' and sheathing 1d are formed with an opening 1e and in this opening is provided a ring 1e' which may rest on the top wall of the tank 1. The insulations 1c and 1c' may be formed from the same material as that used around the tank, as shown at 3. This device which is supported on legs 4, 4, is provided with a cold water inlet pipe 5, a draw-off pipe 5' having a cock 5a, a hot water outlet pipe 6, and an automatic relief valve 6a.

The top of the tank or receptacle 1 (preferably centrally thereof) is provided with a suitable annular ring or spud 7 which is welded or otherwise suitably secured in an opening in the top of the tank. This ring or spud has its top surfaced to receive a brass flange member 8, which is removably fastened to the ring 7 by means of a plurality of cap screws 9, a gasket 10 being provided to make this joint water-tight. A dependent tube 11 of brass or similar material is sweated or integrally mounted in flange member 8, the tube being closed or capped at its free lower end 12. This tube which surrounds the heating elements and protects them from the fluid in the tank 1 is free to expand and contract under the large temperature changes to which it is subjected as it is supported at one end only.

The mounting for the heating element or elements in the tube 11 comprise in the present embodiment, a porcelain cap member or terminal block 13 fitting within the tube 11 and closing its upper end. The block 13 is provided with an annular flange portion 13ª, by means of which it is mounted upon the flange member 8, a plurality of screws 14 being provided for removably fixing the same in position. The cap member 13 carries a central supporting member or rod 15 of Monel metal or similar non-oxidizing material. The inner face of the cap member is formed centrally with an opening 13a' into which the upper end of the rod fits, being removably held therein by a screw 13b extending through the walls of the cap from one side thereof. The rod 15 is formed in sections, preferably two sections designated 15a and 16, which are hinged together by a pin 17, the purpose of which is to be later set forth. The lower portion 16 of the supporting rod has mounted thereon a plurality of porcelain insulating disks 18—18, these disks being secured along the rod 16 in spaced relation by any suitable means such as cotter pins 19. The rod section 16 may be formed with as many openings for the pins 19 to permit of their spacing different distances as desired. The disks 18 have a relatively loose fit with the inner wall of the tube 11 to permit of expansion and contraction of the latter due to changes in temperature. The insulating disks act as spacing and supporting members for the spiral heating elements or coils 20, 21 and 22 which are made of any resistance material suitable for this purpose. I provide a plurality of heating coils, and so connect them that two or more may be energized dependent upon the lowering of the temperature of the water in the tank 1 at any time whereby the water therein may be quickly reheated to its normal or approximately fixed storing temperature without undue loads on the electric supply mains. The heating coils 20, 22, are connected at their lower ends to the coil 21, thereby providing two heating elements. At their upper ends the coils 20, 21, 22 are connected to terminal posts 23, 24 and 25, respectively, carried by the porcelain block 13, by means of connecting ends 26, 27 and 28, these connecting ends being of double the current carrying capacity of the remainder of the heating coils in order to reduce the heating at the terminals. The posts are mounted in openings 23a formed in the block 13. The ends 26, 27, 28, extend through openings 26a formed in the block 13 and to provide for the increased carrying capacity each of these ends extends through the adjacent opening 26a, is then looped around the adjacent terminal and carried back through the opening, being twisted around the upwardly extending portion of the end, so that both portions will carry the current. In order to properly protect these connecting portions of the heating elements they are insulated as shown along the portions 26, 27 and 28 by means of the usual porcelain sleeves, such as are used for this purpose. This form of insulation also renders this portion of these conductors flexible.

29 indicates a cover member removably secured to the sheathing 1d. The cover member 29 functions to protect the terminals of the heating elements, which are supplied with electrical energy through the multiplex cable 30. The cover member comprises an annular plate 29a engaging the ring 1e' and sheathing 1d and removably secured to the latter by screws 29b and a cap 29c. The inner wall of the cap 29c is provided with lugs formed with screw openings through which screws 29d extend to secure the cap to the plate 29a. The cap 29c comprises a side wall 29c' and a plate 29e removably secured to the wall 29c' preferably by means similar to that used to secure the cap to the plate 29a. The side wall 29c' is formed with an opening 30a through which the cable 30 extends (see Fig. 2), this portion of the cable consisting of wires 71, 74, leading from the electric supply mains. That portion of the cable 30 between the terminals 23, 24, 25 and a switch mechanism 31 (to be later described) which functions to control the energization of one or both of the heating elements 20, 22, in the manner to be later set forth, is preferably embedded substantially centrally of the insulations 1c', 3, to provide a unitary enclosed structure without exposed parts and wiring, to protect the wires from being damaged and to eliminate fire risks. This last referred to portion of the cable 30 consists of three wires 72, 73, and 74, as will later be set forth and extends through an opening 30b formed in the ring 1e' and through the central portion of the insulation 1c' to a point near its periphery; it then extends down through the insulation 3 in the space between the tank 1 and the enclosing casing 2, and its outer end passes through an opening 30c formed in the jacket 2 and is connected to the switch mechanism 31. The cable is therefore concealed and cannot be accidentally hit or damaged. It is also embedded within the insulation 1c' and 3 so that danger of fire is reduced to a minimum. I preferably provide means for venting or maintaining relatively cool the terminals 23, 24, 25. The venting means comprise one or more tubes 29' having their inner ends extending through openings 29x formed in the ring 1e' disposed in a plane below the terminals so that the air in rising will circulate across the latter. The tubes are preferably straight from end to end and may extend outwardly through the insulation 1c' and the flange 1d' (see Figs. 1 and 2).

Figure 1:
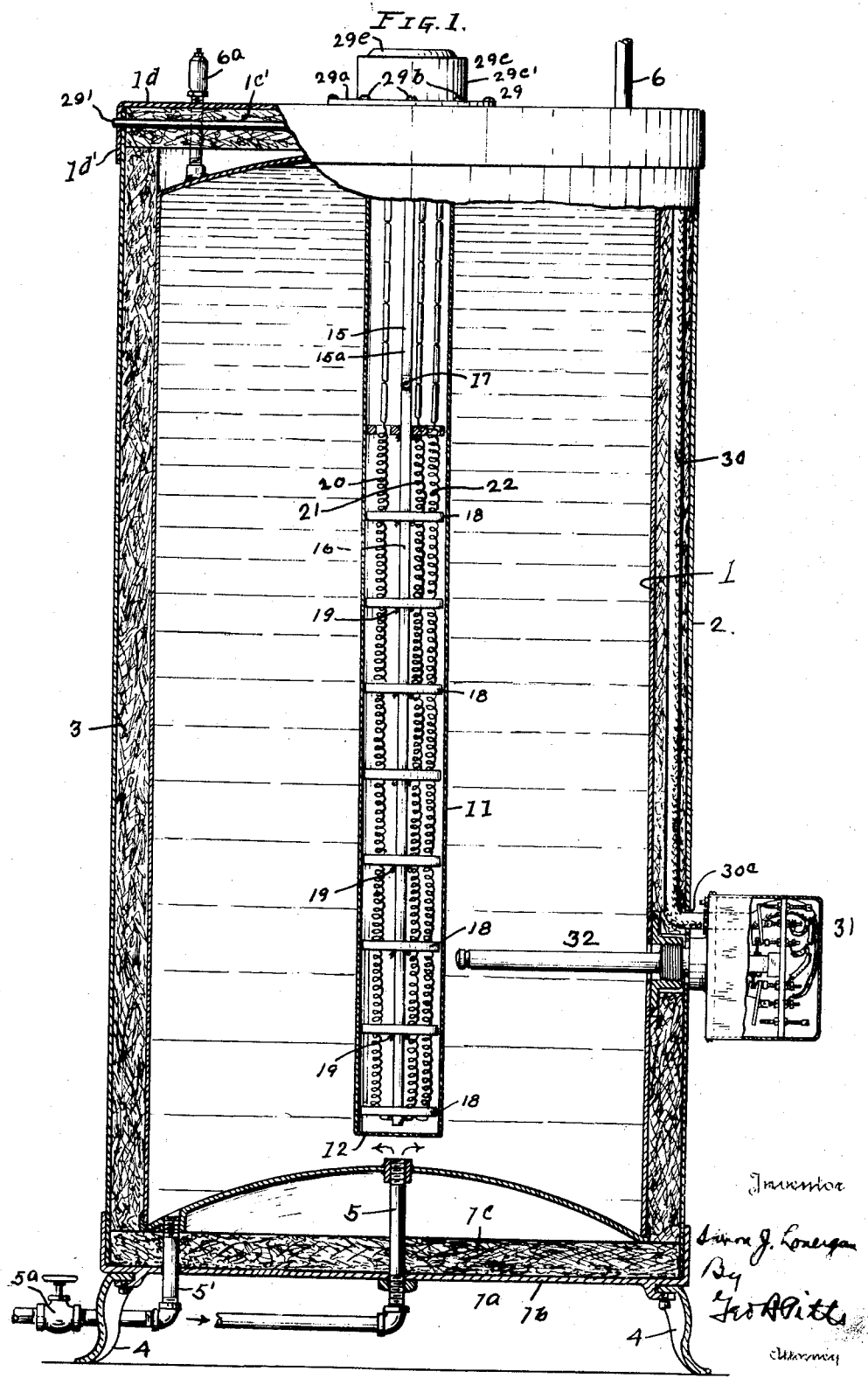
Figure 1 is a side elevational view in section of an embodiment of the invention in the form of a storage hot water heater.
Figure 2:
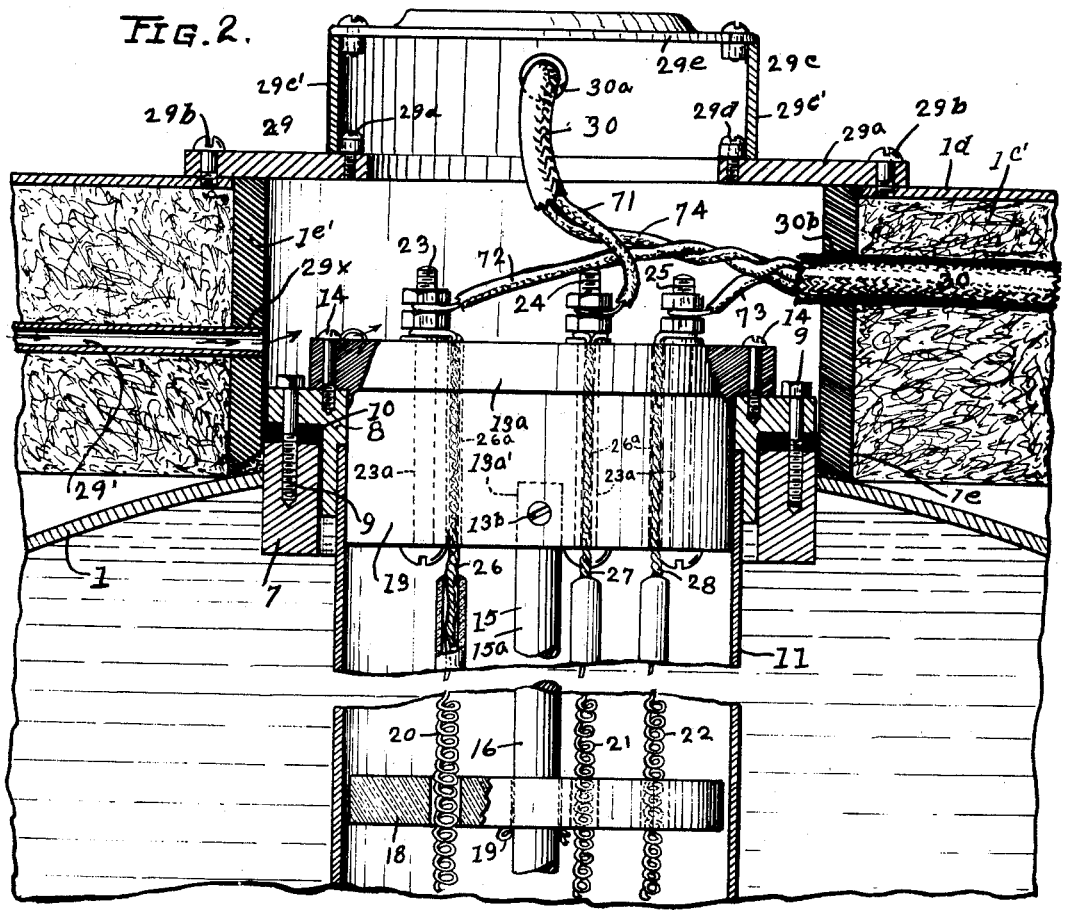
Figure 2 is a fragmentary sectional view.
Figure 3:
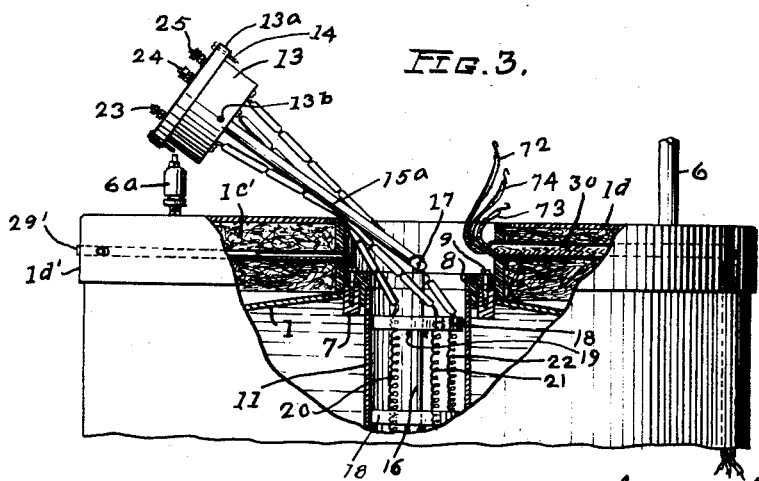
Figure 3 is an elevational view of the upper portion of the heating structure, partially in section, showing the heating elements partly withdrawn.

Referring now to Fig. 3 which shows the heating elements partially removed from the tank, it will be seen that the hinging or articulating of the supporting rod 15a—16 at the joint 17 in conjunction with the flexibility of the conductors 26, 27 and 28 provides for the ready removal and handling of the heating elements from the top of the storage heater, even in instances where a low ceiling clearance is encountered.

To remove the heating elements for replacement or repairs in the manner shown, it is but necessary to remove the cover member 29, disconnect the cable 30 from the terminals 23, 24 and 25, remove the screws 14, 14, and lift the heating elements out, articulating the supporting rod at the joint 17 as the same is drawn out.

It is obvious that the supply of electrical energy to the heating elements may be rendered available by connecting the same to any power supply of proper voltage. These connections may be controlled either manually or automatically. It is preferable however to control the same automatically in such a manner as to energize the heating elements concomitant with the demand for heat as manifested by a decrease in the temperature of the fluid in the tank. This may be done by connecting the heating elements to a plurality of switch devices controlled in proper sequence by thermostatic means located within the tank or receptacle. One form of switch structure which lends itself readily to such application is that disclosed in copending application Ser. No. 116,615, filed June 17, 1926, and while obviously the present invention is not limited to this specific type of switch control, it is used in the embodiment now being described as illustrative of an automatic sequence control of the heating elements. The two major parts of this control are a multi-switch structure 31 preferably mounted on the side of the heater, and a thermostatic device 32 projecting into the fluid space within the heater and controlling the several switches.

Referring now more particularly to Figures 4, 5 and 6 which illustrate this switch structure and thermostatic control in greater detail, the same comprises a base plate 33 which is provided with a threaded boss 34 for the removable attachment of the switch to the tank or receptacle. This boss has mounted therein the tube 32' which is of a material having a relatively large coefficient of expansion. Secured to the inner closed end of the tube and mounted within the same is a rod 35 having a relatively low coefficient of expansion, the outer end of the rod 35 being reduced in size and provided with a rounded end 36. The tube 32' and rod 35 therefore form the thermostatic device which functions to cause the end 36 of rod 35 to move to the right (Figs. 4 and 9) upon increase of temperature of the fluid surrounding the tube 32' and to move to the left upon a decrease of temperature.

The switch mechanism 31 itself is supported from the base plate 33 by means of a frame member 37 of U-shape, the end of the limbs of the U-shaped member being suitably bolted or otherwise fastened to the base member 33. The opposite end of the U-shaped member 37 carries a block 38 and a terminal plate 39, the latter being made of any suitable insulating material. A guide pin 40 is adjustably supported by this block and terminal plate and extends between the limbs of the U-shaped member 37. An operating member 41 is slidably mounted upon the guide member 40, the same being preferably formed with an opening through which the pin 40 extends and normally biased toward the right hand end of the guide pin by means of a spring 42, which is preferably coiled around the guide pin and is contained in an enlarged recess 43, formed in the reciprocating member 41. The outer end of this spring abuts against the inner end of the U-shaped frame member and its inner end abuts against the bottom of the recess 43 formed in the reciprocating member 41. The reciprocating member 41 carries two pins 44 and 45 (preferably threaded into openings in the member 41) which in the embodiment being described are located on diametrically opposite sides of the member 41, and at different distances from the right hand end thereof. The purpose of these pins will later appear. The guide pin 40 may be located in any suitable adjusted position by means of a nut 46.

Two pairs of knife edge supports 47—47 and 48—48 are adjustably mounted on the U-shaped frame member 37. As shown one support of each pair is secured to the front arm of the frame member 37 and aligns with the other support of the pair on the other or rear arm of the frame member. These supports are adjustably secured to the frame member by means of screws 49 and it will be seen that these knife edge supports may be tilted or swung so that the notches at their outer ends may be adjusted by loosening the screws 49. The notches are preferably V-shaped and function to provide seats for rocker levers 50 and 51, the notches or supports 47 providing seats for the rocker lever 50 and the notches of the supports 48 providing seats for the rocker lever 51. A resilient tension member or spring 52 connects the outer end of rocker lever 50, preferably at its middle portion to pin 44, and a similar spring 53 connects the middle portion of rocker 51 to pin 45, the rocker members being cut away at their central portions, or horseshoe shaped to permit the positioning of the spring between the rocker supports. As will later appear, each of the above mentioned springs is under tension to swing or actuate, with a snap action, the rocker to which it is connected about its point of pivotal support accordingly as the pin to which the spring is connected is moved from one side of the fulcrum for the rocker to the other side thereof.

The terminal plate 39 is suitably drilled to receive two switch pivot members 54 and 55, these members having relatively long threaded shanks to provide for adjustment of the pivot point with respect to the terminal plate 39. A rocking switch blade 56 is mounted on the pivot member 54 and a similar blade 57 is mounted on the pivot member 55. Blade 56 is adapted to contact with an adjustable switch contact 58 and the switch blade 57 is adapted to contact with a similar switch contact 59 at its inner end. Adjustable stop members 60 and 61 are provided to limit the opening, or reverse movement of the switch blades 56 and 57, these being arranged to engage the opposite ends of the blades from the contacts. The stop members are supported by the terminal block 39, being mounted in the same manner as the contact members 58 and 59, the stop members however carrying, at their ends adjacent the switch blade, suitable insulated tips. All of the members supported by the terminal block 39 are adjustably fastened thereto by means of nuts carried on their threaded shanks.

The inner ends of the switch blades 56 and 57 are provided with blocks 62 and 63 which are preferably formed of suitable insulating material. These blocks have their inner ends slotted, as shown at 62a, for the loose reception of the outer ends of the rocker levers 50 and 51, the slots functioning to provide operative connections between the outer or free ends of the rocker levers and the switch blades to transmit movement to the latter in a manner to be later set forth. The slots 62a are somewhat wider than the thickness of the rockers 50, 51, which permits the latter when operated to acquire considerable momentum before engaging the opposing wall of the slot, so that the action of the rockers is accelerated to effect snap action of the switch blades 56, 57.

A covering or casing 64 is provided to protect the switch member and electrical connections on the terminal block.

A compound lever structure is provided to transmit the movement of the rod end 36 of the thermostat to the reciprocating member 41, the same comprising a U-shaped lever 65 with its open ends pivoted to an adjustable fulcrum block 66. Two projections 67 are provided near the free end of this lever and these projections are in contact with the adjacent end of the reciprocating member 41 which is urged against the projections by means of the spring 42. The inner or free end of the guide pin 40 provides a fixed fulcrum for the end of a second lever 68 which is located intermediate the limbs of the U-shaped lever 65. Lever 68 which is pivoted to lever 65 by a pivot pin 69 is provided with a suitable socket 70 to receive the rounded point or end 36 of the rod 35.

The switch contact members 58 and 59 are connected through the common lead 74 of cable 30 to one side of a suitable power supply as shown in Fig. 10. The other side of the power supply is connected by means of a conductor 71 to terminal post 24 which has connection with the heating coil 21.

The bottom end of coil 21 is connected to coils 20 and 22, the upper ends of which are connected by leads 72 and 73 to the switch blades 56 and 57, respectively, through their respective pivot posts 54 and 55. It will therefore be seen that with both of the switch blades 57 and 56 in the open position (Fig. 4), no current will flow through any of the heating elements. When, however, switch blade 57 is closed (Fig. 5), current will flow from the main line circuit through lead 71, heating coil 21, heating coil 22, lead 73 through switch blade pivot member 55 and through the closed switch blade 57 and contact 59 back through lead 74 to the other side of the line. When switch blade 56 is actuated to a closed position (Fig. 6) current will also flow through lead 71, heating element 21, heating element 20, through lead 72 and through switch blade 56 and associated switch contact 58 back through the common lead 74 to the other side of the line. It will therefore be evident that with both switch blades in closed position, all three of the heating coils or elements will be energized instead of the two which are energized with the closing of a single switch blade.

The operation of the embodiment just described is as follows: Assuming that the water or other fluid in the tank 1 is at a sufficiently high temperature, the point 36 of the rod 35 will be retracted to the right a sufficient amount to permit the reciprocating member 41 to travel along the guide pin 40 under the bias of spring 42 to a point where both switch blades 56 and 57 will be in the open position, as shown in Fig. 4. Assuming now that the water or fluid surrounding the tube 32' cools a certain amount such as will occur when some of the heated fluid is withdrawn and replaced by cold fluid, the point 36 will move toward the left which motion will be multiplied and transmitted to the member 41 by means of the compound levers 65 and 68. This will cause member 41 to move to the left against spring 42 a sufficient amount to cause the pin 45 to pass the fulcrum point of the rocker member 51, thereby causing the snap actuation of switch lever 57 to the closed position, as shown in Fig. 5. This will cause electric energy to be supplied to the heating elements 21 and 22 which will be followed by a consequent heating up of the fluid in the tank 1. When the original temperature is reached the subsequent return movement of the member 36 to the right will cause the reciprocating member 41 to also move to the right with the consequent snap actuation of the switch blade 57 back to the open position. If, however, a relatively large amount of water is drawn off from the tank 1, the cooling effect will be sufficient to cause the end 36 of the rod 35 to move to the left a sufficient amount to cause not only pin 45 to pass the fulcrum point of rocker member 51 but to cause pin 44 to pass the fulcrum point of rocker 50 as well, thereby causing the snap actuation of both switch blades 57 and 56 to the closed position, as shown in Fig. 6, which will render available all of the heating elements 20, 21 and 22 for the supply of heat to the fluid in the tank 1. As the fluid in the tank becomes heated the point 36 of the rod 35 will gradually retract to the right causing a correspondingly magnified movement of member 41 to the right which in turn will cause a snap actuation of switch blade 56 to the open position. Such snap actuation of the switch blade 56 will cut out of circuit the associated heating element 20 and will therefore cut down the supply of energy. Upon still further rise in temperature of fluid in the tank 1, point 36 of rod 35 will be retracted still further to the right and will in turn cause a corresponding movement of member 41 to a position where switch blade 57 will also be snap actuated to the open position, thereby cutting off all supply of electrical energy to the heating elements when a proper temperature of the fluid is reached.

It will therefore be evident that the thermostatic structure and associated switch structure provides an automatic control for the supply of electrical energy for heating purposes at various rates, and the thermostat means may be adjusted so that under normal operating conditions where a normal demand is made upon the tank for hot water, only a portion of the heating elements will be energized to reheat the contents of the tank and restore the same to its original temperature. If, however, a larger demand is made upon the contents of the tank with a consequent greater reduction in the temperature of the contents, more of the heating elements will automatically be brought into action to provide a greater supply of heat than normal for a certain portion of the reheating period. Such automatic control, which may include any desired number of heating elements associated with the proper plurality of sequence operated switch contacts, provides a structure which will be economical to operate and which will not impose peak demands upon the power line to which the heater is connected under ordinary operating conditions. At the same time, when it becomes necessary to make a large demand upon the tank for hot water, the structure is such that an additional amount of electrical energy is automatically rendered available for the purpose of quickly reheating the relatively cool water in the tank.

In certain installations and particularly in installations of the larger sizes, the current necessary for the heating might be of such a character that a relatively heavy pressure and larger contact area might be needed at the switch contacts. In installations of this character the relay system of control such as is shown in Fig. 11 might be preferable. Referring to the modification of the circuit arrangement herein shown, a relay structure is provided having two solenoids or magnets 74', having two magnets 75 and 76, one end of the winding on magnet 75 being connected to switch contact 58', the corresponding end of the winding on magnet 76 being connected to the switch contact 59'. The opposite ends of the windings of the magnets are connected to a common lead 77 which in turn is connected through the return lead 71' to the mains. The switch blade members 56' and 57' are connected through their pivotal points and the common lead 74ˣ back to the other side of the mains. It will therefore be seen when the switch blade 57' is actuated to closed position that magnet 76 will be actuated and when switch blade 56' is moved to closed position magnet 75 will become actuated. Magnet 76 is provided with a movable armature 78 and magnet 75 is provided with a similar movable armature 79, both of these armatures being biased to an upper or open position by virtue of the springs 80 and 81, respectively. When either of the magnets 76 or 75 is excited the corresponding armature is actuated against the tension of the adjacent spring to a position in which the associated contact 78' or 79' contacts with a single stationary contact member 82 which latter is connected through the lead 83 to one side of the main circuit. Armature 79 is connected by means of a lead 84 to the upper end of heating coil 20' and armature 78 is connected by means of lead 84' to the upper end of heating coil 22'. The heating coils 20', 21' and 22' are interconnected at their lower ends as have been previously described, and the upper end of heating coil 21' is connected through a lead 71ˣ and the lead 71' to the other side of the main circuit.

The operation of this modification is as follows: Assuming conditions within the tank to be such that the switch blade 57' is closed, the corresponding magnet 76 will be energized to cause the contact 78' to be closed against the common contact 82. This will cause a flow of energy from the mains through the leads 71', 71ˣ, heating coil or element 21', heating coil 22', lead 84' and contacts 78', 82, back through lead 83 to the mains again. If, however, the reduction in temperature in the fluid of the tank has been sufficient to actuate both switch blades 56' and 58', then the magnet 75 will also be energized causing its armature 79 to be also attracted with a consequent closing of contact 79' against the stationary contact 82, thereby causing the current to flow also through heating coil 20' back from lead 84 and through the common lead 83 back to the mains.

It will therefore be evident that the heating action in general is the same as that previously described with the exception that the contacts of the thermostatic switch instead of directly controlling the flow of energy to the heating coils, function to indirectly control this energy through the medium of the electromagnetic switch structure.

It of course should be recognized that instead of utilizing the specific switch structure shown in connection with the thermostat any other suitable type capable of actuation by a movement of the end 36 of the rod 35 might be employed, and also any other type or combination of thermostatic elements capable of giving a reciprocating motion to the member 41 of the specific switch structure shown could be utilized. Also, if desirable a plurality of the thermostatic devices associated with individual switch devices could be utilized to effect the desired control.

From the foregoing description it will be noted that I have provided a heating apparatus having a plurality of heating units which may be adequately controlled to maintain the water in the tank at any predetermined temperature within normal ranges without undue consumption of current or effecting a peak load on the supply mains except where an unusual demand is made upon the heated water and that this variable or multi control is effected by a single thermostat. It will also be noted that all parts of the heating means may be readily removed, that the heating units may be separately removed, that provisions are made for expansion and contraction of the enclosing member for the heating units and that this member may be provided with sufficient heat conducting surface to decrease the heat per square unit of surface thereof to reduce or eliminate liming on its exterior surface.

It will also be evident that the structure is not limited to the specific embodiments which have been illustrated and described herein, but the same may find utilization in various modifications and the invention is therefore susceptible of numerous embodiments within the scope of the appended claims.

What I claim is:

1. In a device of the character described, the combination of a receptacle for holding a fluid adapted to be heated therein, a dependent tubular member mounted in the top of said receptacle and located within the interior thereof, and removable means for supplying heat to said fluid comprising an electrical heating element and articulatable sections for supporting said element suspended from the top of said receptacle and located within the interior of said tube.

2. An electrical heater for use in the interior of fluid receptacles, comprising a terminal block, an articulatable rod mounted therein, a plurality of supporting members separately mounted along said rod and heating coils supported by said members.

3. An electrical heater for use in the interior of fluid receptacles, comprising a terminal block, an articulatable rod mounted at one end therein, a plurality of supporting members separately mounted on and spaced along said rod, and heating coils supported by said members with their axes parallel to the axis of said supporting rod.

4. An electrically heated storage tank combined with a hot water supply system and comprising an upright heat-insulated casing, a vertical tube open at its upper end and supported in the top wall of said casing and depending therefrom into the water, a plurality of electrical heating elements within said tube and extending vertically therealong to heat water outside said tube and adapted to receive energy from a source of electrical power, through a plurality of circuits, and means dependent on different degrees of temperature of the fluid in said casing for successively closing each of said circuits to control the energization of said heating elements.

5. An electrically heated storage tank combined with a hot water supply system and comprising an upright heat-insulated casing, a vertical tube open at its upper end and supported in the top wall of said casing and depending therefrom into the water, a plurality of electrical heating elements within said tube and extending vertically therealong to heat water outside said tube and adapted to receive energy from a source of electrical power, through a plurality of circuits, switches intercalated in said circuits and means dependent on different degrees of temperature of the fluid in said casing for successively operating each of said casing for successively operating each of said switches to control the energization of said heating elements.

6. An electrically heated storage tank combined with a hot water supply system and comprising an upright heat-insulated casing, a vertical tube at its upper end and supported in the top wall of said casing and depending therefrom into the water, a plurality of electrical heating elements within said tube and extending vertically therealong to heat water outside said tube and adapted to receive energy from a source of electrical power, through a plurality of circuits, and an automatic temperature controlled switch intercalated in each of said circuits for controlling the energization of said heating elements.

7. An electrically heated storage tank combined with a hot water supply system and comprising an upright heat-insulated casing, a vertical tube in said casing open at its upper end and supported by the top wall of said casing and depending therefrom into the water, a plurality of electrical heating elements within said tube and extending vertically therealong to heat water outside said tube and adapted to receive energy from a source of electrical power, a plurality of circuits for connecting said heating elements to said source of electrical power, and an automatic heat actuated switch intercalated in each of said circuits for controlling the energization of said heating elements.

8. In a device of the character described, the combination of a receptacle for holding a fluid adapted to be heated therein, a closed member within said receptacle and surrounded by the fluid therein, a plurality of electrical heating elements mounted in said closed member for heating said fluid and adapted to receive energy from a source of electrical power, a plurality of circuits for connecting said heating elements to said source of electrical power, and automatic heat controlled progressively actuated switches intercalated in said circuits for controlling the energization of said heating elements.

9. An electrically heated storage tank combined with a hot water supply system and comprising an upright heat-insulated casing, a vertical tube open at its upper end and supported in the top wall of said casing and depending therefrom into the water, a plurality of electrical heating elements within said tube and extending vertically therealong to heat water outside said tube and adapted to receive energy from a source of electrical power, a plurality of circuits for connecting said heating elements to said source of electrical power, and automatic heat controlled progressively actuated electromagnetic switches intercalated in said circuits for controlling the energization of said heating elements.

10. In apparatus of the class described, the combination of a receptacle for holding a fluid and having an insulating jacket, an electric heating means within said receptacle, a mounting in the walls of the said receptacle and jacket for said heating means, an automatic heat actuated switch mounted upon the wall of said receptacle, and electric connections between the terminals of said heating means in said mounting and said switch, said connections being disposed within and extending through said jacket.

11. In apparatus of the class described, the combination of a receptacle for holding a fluid and having an insulating jacket for its top and side walls, an electric heating means within said receptacle, a mounting in the top walls of the said receptacle and jacket for said heating means and its terminals, an automatic heat actuated switch mounted upon the side wall of said receptacle, and electric connections between the terminals of said heating means in said mounting and said switch, said connections being disposed within and extending through the top and side walls of said jacket.

12. In apparatus of the class described, the combination of a receptacle for holding a fluid and having an insulating jacket, an electric heating means within said receptacle, a mounting in the walls of the said receptacle and jacket for said heating means and its terminals, an automatic heat actuated switch mounted upon the wall of said receptacle, electric connections between the terminals of said heating means in said mounting and said switch, and ventilating means for the terminals in said mounting.

13. In apparatus of the class described, the combination of a receptacle for holding a fluid and having an insulating jacket, an electric heating means within said receptacle, a mounting in one wall of said receptacle and jacket for said heating means and its terminals, an automatic heat actuated switch mounted upon the wall of said receptacle, electric connections between the terminals of said heating means in said mounting and said switch, and ventilating means for the terminals in said mounting, said ventilating means comprising tubes extending through the top wall of said jacket into the said mounting.

14. An electrically heated storage tank combined with a hot water supply system and comprising an upright heat-insulated casing, a vertical tube open at its upper end and supported in the top wall of said casing and depending therefrom into the water, a plurality of electrical heating elements within said tube and extending vertically therealong to heat water outside said tube a plurality of switches each controlling the circuit for one of said elements, and means common to said switches operable by the rise and fall in temperature of the fluid in said receptacle, said means being operatively connected with said switches and arranged to quickly close one of said switches when the fluid reaches a substantially predetermined degree of temperature and to quickly close the other switch when the fluid reaches a different degree of temperature.

15. A storage tank for electrically heated water combined with a hot water supply system and comprising an upright heat-insulated casing, a vertical tube in said casing open at its upper end to permit access thereto, removable means for supporting the upper end of said tube in a liquid tight manner on the upper wall of said casing and a removable electric heater within and extending vertically along said tube and connected to conductors through the open end of said tube.

16. A storage tank for electrically heated water combined with a hot water supply system and comprising an upright heat-insulated casing, a vertical tube in said casing open at its upper end to permit access thereto and supported by the top wall of said casing, and electric heater mounted in and extending along said tube, said heater comprising a main coil and a pair of coils connected at one end to said main coil to form two circuits, and switch means for closing one circuit or both circuits.

17. A storage tank for electrically heated water combined with a hot water supply system and comprising an upright heat-insulated casing, a vertical tube in said casing open at its upper end to permit access thereto and supported by the top wall of said casing, an electric heater mounted in and extending along said tube, said heater comprising a main coil and a pair of coils connected at one end to said main coil to form two circuits, switch means for closing one circuit or both circuits, and a thermostat extending within said casing and arranged to actuate said switch means dependent on different degrees of temperature of the water in said casing.

In testimony whereof, I have hereunto subscribed my name.

SIMON J. LONERGAN.